April 26, 1927.
W. E. NEWNAM
PIG LEAD TRUCK
Filed Sept. 4, 1923
1,626,350
3 Sheets-Sheet 3
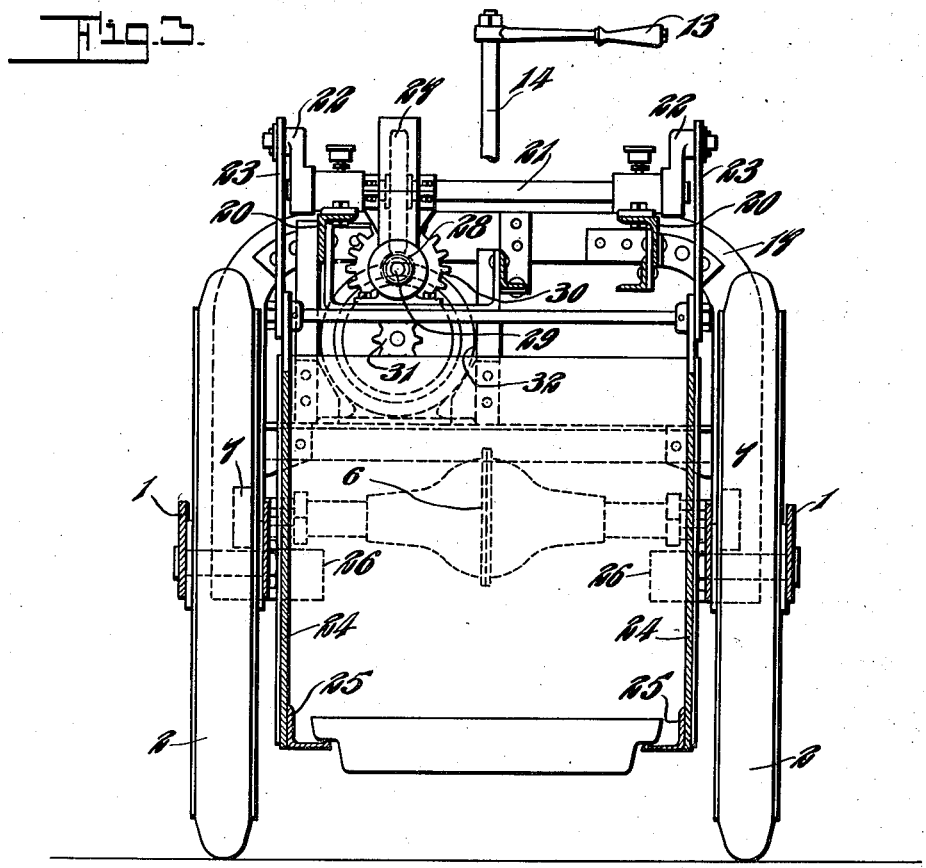
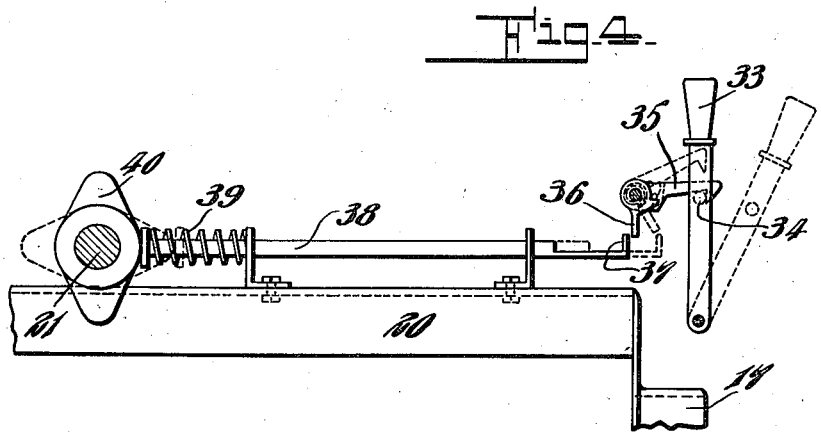
Inventor.
WILLIAM E. NEWNAM.

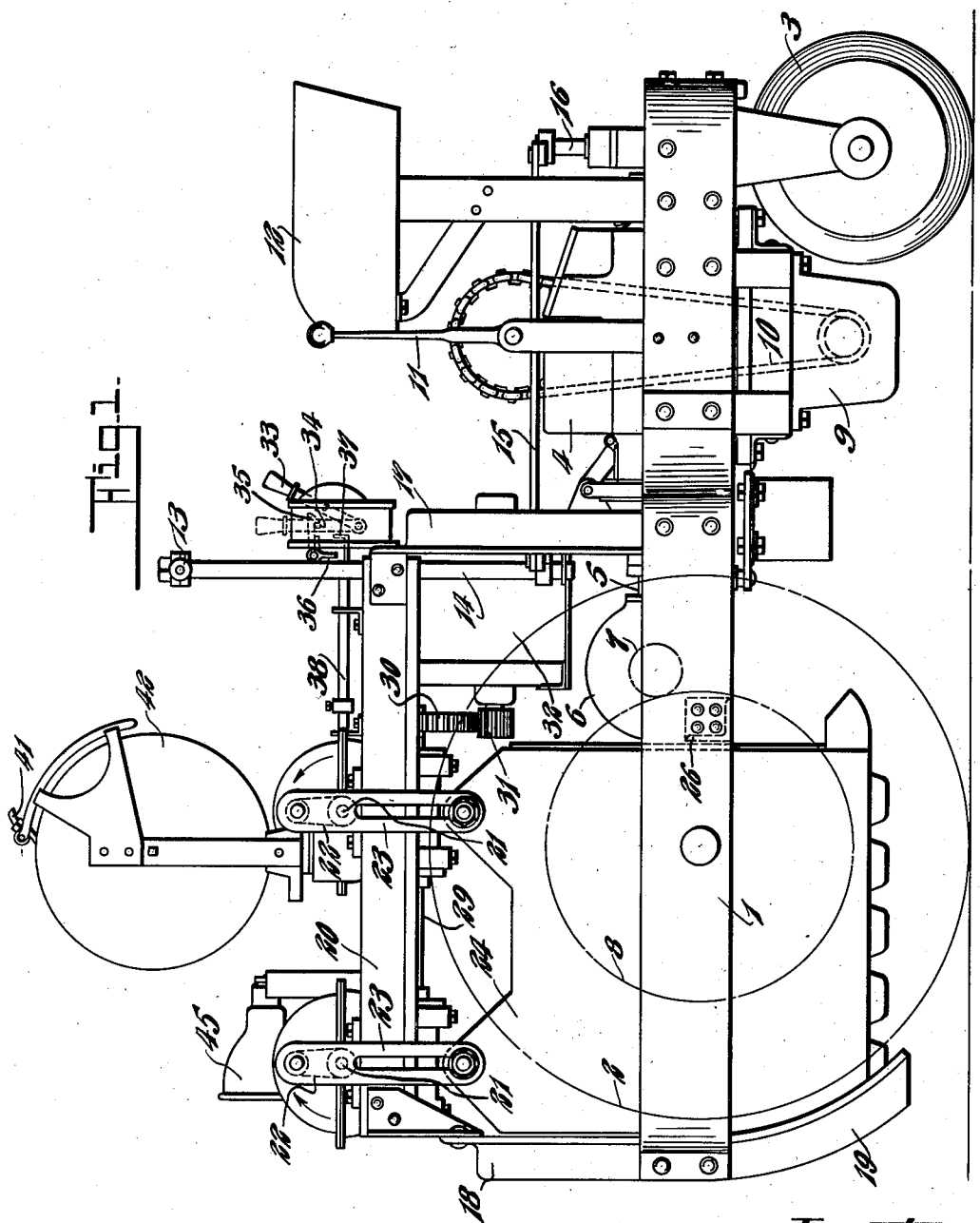

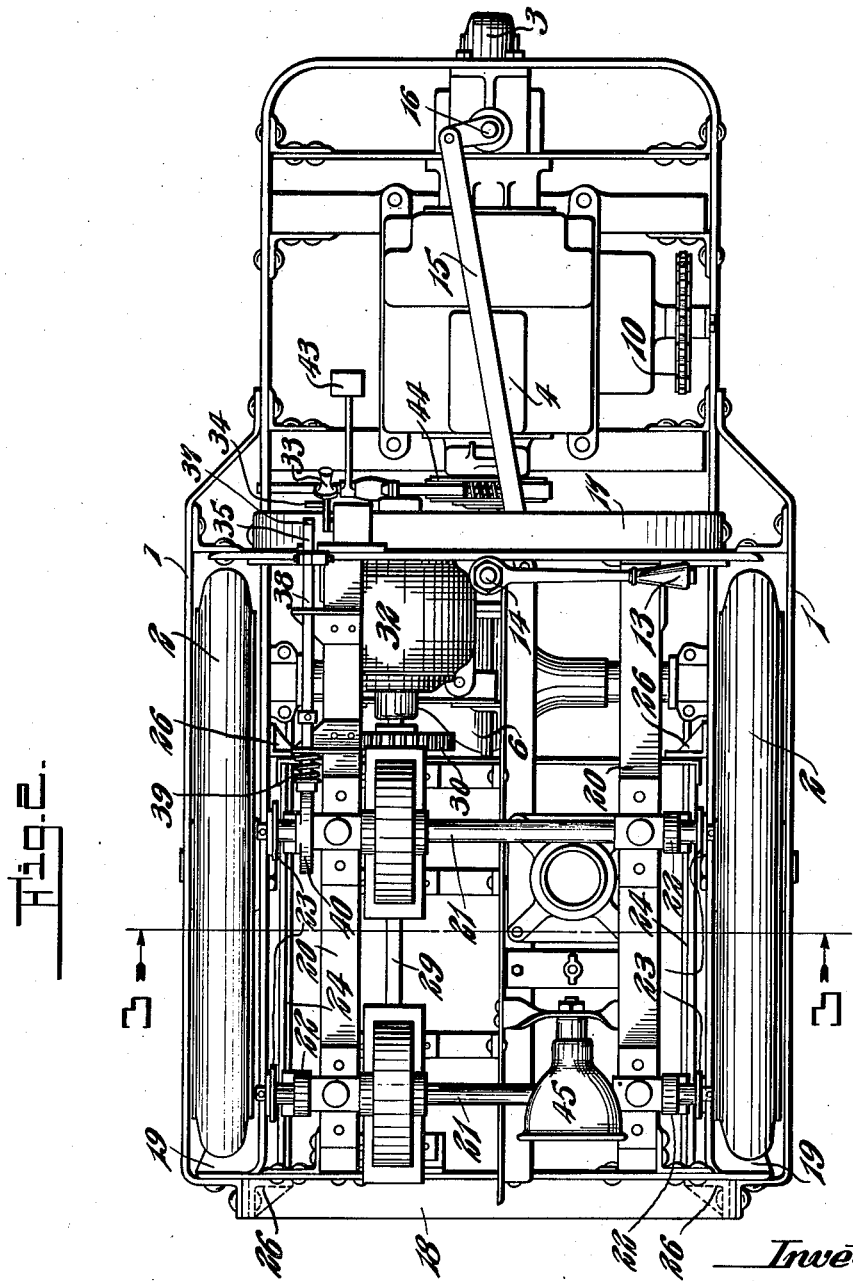

Patented Apr. 26, 1927.

1,626,350

UNITED STATES PATENT OFFICE.

WILLIAM E. NEWNAM, OF COLLINSVILLE, ILLINOIS, ASSIGNOR TO NATIONAL LEAD COMPANY, OF JERSEY CITY, NEW JERSEY, A CORPORATION OF NEW JERSEY.

PIG-LEAD TRUCK.

Application filed September 4, 1923. Serial No. 660,885.

This invention relates to power driven trucks, and more particularly to such trucks as are used in industrial establishments for picking up and carrying a load of articles, such as lead pigs or the like, and transporting the same from place to place.

In the lead industry, the metallic lead after being smelted is formed into ingots or pigs of a certain size and weight convenient for handling and merchandising. At the completion of the operation of molding such pigs the same are stacked one upon the other as they are removed from the molding apparatus. The operation of transporting the pigs from place to place as, for instance, in loading for shipment is difficult on account of the great weight of the pigs so that handling manually is practically impossible.

One of the objects of this invention, therefore, is to provide a truck which will be capable of picking up a complete stack of pigs or other articles and to carry the same from place to place.

Another object of this invention is to provide such a truck which will be safe and convenient to handle, and which will pick up or place the load as desired.

Another object of this invention is to provide a novel mechanism for picking up the load so as to raise or lower the same positively and without jolting or jarring.

Another object of this invention is to provide means for controlling the lifting carriage so as to be automatic in its operation of lifting or depositing the load.

Further objects will appear from the detail description taken in connection with the accompanying drawings, in which:

Figure 1 is a side elevation of a truck embodying this invention;

Figure 2 is a plan view of the same;

Figure 3 is a section on line 3—3, Figure 2; and

Figure 4 is a detail of the controlling mechanism for the lifting carriage.

Referring now to the accompanying drawings, 1 designates a chassis provided with a pair of traction wheels 2 at the forward end thereof and a steering wheel 3 at the rear end thereof. A driving mator 4 is mounted on the rearward end of the chassis and connected by means of a propeller shaft 5 and the usual differential gearing 6 to a pair of pinions 7 meshing with a pair of gears 8, one on each of the traction wheels 2. The motor is thus adapted to drive the traction wheels so as to propel the truck. A suitable controller for the motor 4 is mounted within the housing 9 and connected by means of a chain 10 to a control handle 11 mounted adjacent the driver's seat 12 on the rear end of the chassis. A steering handle 13 is connected by means of a shaft 14 and a link 15 with the spindle 16 of the steering wheel 3. A foot-brake 43 is adapted to operate on a brake-drum 44 on the propeller shaft 5. The driver's seat is placed on the rear of the chassis so that he may have the mechanism for lifting and carrying the load and the controls therefor in front of him as well as being able to drive the carriage with the load in front so that he may at all times watch the operation and in depositing the load be able to place the same exactly as desired.

The chassis is spanned by a pair of arches 17 and 18 at its middle and front end respectively. The legs of the latter arch are extended downwardly to provide guards 19 before the traction wheels. These arches may be constructed of suitable iron angles or the like and serve to stiffen the chassis transversely since the forward end thereof is otherwise open. Supported on the arches 17 and 18 is a pair of longitudinal beams 20 which support the lifting and controlling mechanisms for the lifting carriage. Mounted in bearings on the beams 20 is a pair of shafts 21, each carrying at its ends a pair of alined cranks 22. Each crank carries a link 23 which is connected at its other end by means of a pin and slot connection with the lifting carriage 24. There are four of these links connected in pairs to the front and rear ends of the carriage so that the carriage is uniformly supported thereby when in raised position.

The carriage 24 is constructed of metal plates forming the rear and sides, and provided at the bottom on each side with an angle plate 25 mounted with one of its flanges turned inwardly as illustrated in Figure 3. The bottom of the carriage is otherwise open and the inturned flanges of the angles 25 are adapted to take under the end projections with which the pigs are cast as illustrated in Figure 3. The carriage 24 is thus adapted to hang on the links 23 and may be raised and lowered by raising and lowering these links by turning the cranks 22. Suitable guides 26 may be fixed to the chassis in front and rear of the carriage so as to guide the same in its vertical movement and prevent its swinging during travel. The shafts 21 each carry a worm-wheel 27 meshing with a worm 28 on a shaft 29 connected by means of gears 30 and 31 to a raising and lowering motor 32 suitably supported on the beams 20. The worm gears 27 and 28 are so arranged that when driven by the motor 32, the gears 27 will rotate in opposite directions and at the same speed. It follows, therefore, that the shafts 21 will be rotated in opposite directions and at the same rate and that, therefore, the cranks 22 will move in a similar manner. This arrangement provides that the inclination of the links 23 consequent to the rotation of the cranks 22 will at all times be equal and opposite so that horizontal pull on the carriage will be balanced by each pair of links. Thus there will be no tendency for the carriage to swing forward and back as the cranks 22 change their position during the raising or lowering operation.

It will be noted that on account of the non-reversibility of the worm gear connections, the raising and lowering of the carriage will be positive and uniform. There will be no tendency for instance for the carriage to drop suddenly when being loaded, but will be let down gradually and gently in accordance with the speed of rotation of the motor 32. The pin and slot connection of the links 23 to the carriage provides some play to allow for picking up or depositing the load on uneven ground.

In order to insure that the carriage will be raised or lowered to its full extent, automatic control mechanism is provided. A spring-opened switch 33 is provided as a starting switch for the motor 32. This switch may be arranged so that it will return to open position as soon as the handle is released. The handle is provided with a pin 34 adapted to be retained by a latch 35 when the switch is closed. This latch is provided with a tripping dog 36 adapted to be engaged by a finger 37 on the end of a sliding rod 38 mounted to slide longitudinally on one of the beams 20. A spring 39 is connected with the rod 38 to urge the same in a forward direction until engaged by a cam 40 mounted on one of the shafts 21. The cam 40 is provided with two diametrically opposite wings, each adapted to engage the end of the rod 38 to move the same for tripping the switch 33. The cam 40 is so placed on the shaft that one of the wings will engage the rod 38 when the carriage is in fully raised position and the other when the carriage is in fully lowered position. Thus in order to raise or lower the carriage the operator simply closes the switch 33, whereupon the motor 32 starts and raises or lowers the carriage. At the completion of such movement, the cam 40 moves the rod 38 to trip the latch 35, thereby allowing the switch 33 to open and stop the motor.

Current for the motors 4 and 32 may be derived from any suitable source. In the truck illustrated the use of an external trolley is contemplated. A conductor 41 from such trolley (not shown) is fixed upon a self-winding reel 42 which operates to take up the slack in the conductor 41 and to transmit the current received by said conductor to the motors. In this way it is possible for the truck to move about over a considerable area independently of the location of the trolley. The truck can, therefore, move into freight cars and the like for depositing or picking up its load.

A head-light 45 may be provided for night operation.

It will be evident that this invention provides a truck for lifting and carrying heavy loads which is convenient and efficient to operate. The carriage moves vertically in lifting its load so that the driver can insert the carriage accurately beneath the load before raising the same and in depositing the load, he can accurately position the carriage before lowering it so that the load may be placed just as desired. Oppositely rotating cranks balance the side pulls of the links so that there is no tendency for the carriage to swing during the raising or lowering operations. A separate lifting motor 32 avoids all complicated change connections, such as clutches and the like, which are sometimes used to connect the truck propelling motor to lift the carriage. The automatic control of the starting switch 33 provides a convenient and safe means for operating the carriage and one that insures the accurate stopping of the carriage at the proper points. The non-reversible worm gear drive for the lifting mechanism provides for the positive and uniform lifting and lowering. The driver's seat is placed in the rear as mentioned previously so that he may have the mechanism which he is to control before him instead of behind him as in the usual truck.

It is obvious that various changes may be made in details of construction without departing from the spirit of this invention; it is, therefore, to be understood that this invention is not to be limited to the specific details shown and described.

Having thus described the invention, what is claimed is:

1. A truck of the character described comprising a chassis, traction wheels on the front of said chassis and adapted to straddle the load, a steering wheel on the rear of said chassis, a motor for driving said traction wheels to propel the truck, an elevating carriage between said traction wheels and adapted for vertical elevation to carry the load, elevating mechanism for said carriage adapted to raise and lower the same in a vertical line comprising oppositely moving cranks on said chassis and arranged along said carriage, a motor for said elevating mechanism and automatic means positively connected to said motor for stopping said mechanism when the carriage reaches a predetermined position.

2. A truck of the character described comprising a chassis, traction wheels on the front of said chassis and adapted to straddle the load, a steering wheel on the rear of said chassis, a motor for driving said traction wheels to propel the truck, an elevating carriage between said traction wheels and adapted for vertical elevation to carry the load, means on said carriage adapted to engage the load close to the ground, elevating mechanism for said carriage adapted to raise and lower the same in a vertical line, comprising cranks arranged along said chassis above said carriage, a motor for said elevating mechanism, a starting switch for said elevating motor, and automatic means positively connected to said motor for opening said switch to stop the motor when said carriage reaches a predetermined position.

3. A truck of the character described, comprising, a chassis, running gear, a carriage on said chassis adapted to straddle the load in order to pick up and carry the same, and means for elevating said carriage, including cranks on said chassis and links connected to the ends of said carriage and the said cranks, constructed and arranged to mutually balance the pulls thereof along said carriage and lift the same vertically.

4. A truck of the character described, comprising, a chassis, running gear, a carriage on said chassis adapted to straddle the load in order to pick up and carry the same, and means for elevating said carriage including oppositely moving cranks on said chassis and arranged along said carriage, and connections from said cranks to said carriage constructed and arranged to mutually balance the pulls thereof along said carriage.

5. A truck of the character described, comprising, a chassis, running gear, a carriage on said chassis adapted to straddle the load in order to pick up and carry the same, and means for elevating said carriage vertically, including cranks on said chassis and arranged along said carriage, means for oppositely rotating said cranks, and links connecting said cranks with the ends of said carriage.

6. A truck of the character described, comprising, a chassis, running gear, a carriage on said chassis adapted to straddle the load in order to pick up and carry the same, and means for elevating said carriage vertically including cranks on said chassis arranged along said carriage and adapted to move in opposite directions, and links connecting said cranks with the ends of said carriage, said links having a loose connection with said carriage.

7. A truck of the character described, comprising, a chassis, running gear, a carriage on said chassis adapted to straddle the load in order to pick up and carry the same, and means for elevating said carriage, including cranks on said chassis and arranged along said carriage, worms operating said cranks in opposite directions, and links from said cranks to said carriage adapted to lift said carriage vertically.

In testimony whereof I affix my signature this 27th day of August, 1923.

WILLIAM E. NEWNAM.